US007464328B2

(12) United States Patent
Hall et al.

(10) Patent No.: US 7,464,328 B2
(45) Date of Patent: Dec. 9, 2008

(54) METHOD AND SYSTEM FOR PACKING AND UNPACKING WEB PAGES

(75) Inventors: Gabriel J. Hall, Woodinville, WA (US); Alan Ramaley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 522 days.

(21) Appl. No.: 10/962,018

(22) Filed: Oct. 8, 2004

(65) Prior Publication Data

US 2005/0050461 A1  Mar. 3, 2005

Related U.S. Application Data

(63) Continuation of application No. 09/587,756, filed on Jun. 6, 2000, now Pat. No. 6,886,132.

(51) Int. Cl.
*G06N 3/00* (2006.01)
(52) U.S. Cl. .................................................... 715/234
(58) Field of Classification Search ................. 715/500, 715/501.1, 511, 513, 514, 515, 523, 526, 715/530, 517, 234, 243, 254, 255
See application file for complete search history.

(56) References Cited

U.S. PATENT DOCUMENTS

| | | | |
|---|---|---|---|
| 5,987,611 A | 11/1999 | Freund | 713/201 |
| 6,098,069 A | 8/2000 | Yamaguchi | 707/102 |
| 6,282,548 B1 | 8/2001 | Burner et al. | 707/104.1 |
| 6,374,266 B1 | 4/2002 | Shnelvar | 707/204 |

(Continued)

OTHER PUBLICATIONS

"GNU Tar: an archiver tool," <http://sunsite.ualberta.ca/Documentation/Gnu/tar-1.13/html_chapter/tar_toc.html>, Dec. 12, 1999.*

(Continued)

*Primary Examiner*—Stephen S Hong
*Assistant Examiner*—Kyle R Stork
(74) *Attorney, Agent, or Firm*—Merchant & Gould

(57) ABSTRACT

A method for packing the multiple files and folders of an HTML Web page into a single MHTML file. The packing process begins by determining whether the user has write privileges to the current location. If not, the user is prompted to save the MHTML file in an alternate location (e.g., the desktop). If the user has write privileges to the current location, the process opens the main HTML Web page and searches for supporting resource files. In short, the supporting resource files are identified by searching for known, common resource file references in the main HTML source file. When the resource file references have been identified, the process packages the main HTML document and all of the supporting resource files into a single file in MHTML format. The unpacking process opens the MHTML file and identifies the main HTML document portion, as well as the portions of the MHTML file containing the supporting resource files. Once all of the components have been identified, the Web page's folder structure is determined by referring to the content location field contained in each separate portion of the MHTML file. The individual MHTML components are converted into files and the main HTML file is stored. The resource files are stored in locations relative to the main HTML file, as identified by the unpacked folder structure.

11 Claims, 9 Drawing Sheets

U.S. PATENT DOCUMENTS

| | | | |
|---|---|---|---|
| 6,405,225 B1 | 6/2002 | Apfel et al. | 715/526 |
| 6,523,063 B1 | 2/2003 | Miller et al. | 709/206 |
| 6,618,728 B1 | 9/2003 | Rail | 707/101 |
| 6,625,624 B1 | 9/2003 | Chen et al. | 707/204 |
| 6,635,088 B1 | 10/2003 | Hind et al. | 715/513 |

OTHER PUBLICATIONS

J. Palme et al., "MIME Encapsulation of Aggregate Documents, Such as HTML (MHTML)," Mar. 1999, Network Working Group, RFC 2557, pp. 1-27.

\* cited by examiner

```
MIME-Version: 1.0
Content-Type: multipart/related;
        boundary="----=_NextPart_000_0000_01BF4561.A9B32F20"
X-MimeOLE: Produced By Microsoft MimeOLE V5.00.2314.1300

This is a multi-part message in MIME format.
------=_NextPart_000_0000_01BF4561.A9B32F20
Content-Type: text/html; charset="iso-8859-1"
Content-Transfer-Encoding: quoted-printable
Content-Location: file:///C:/WINDOWS/Desktop/Pages/Page.htm (content for the main file, including a link to "image001.gif" and
"filelist.xml")

------=_NextPart_000_0000_01BF4561.A9B32F20
Content-Type: image/gif
Content-Transfer-Encoding: base64
Content-Location:
file:///C:/WINDOWS/Desktop/Pages/Page_files/image001.gif (content for the image inside of "Page_files")

------=_NextPart_000_0000_01BF4561.A9B32F20
Content-Type: text/xml; charset="iso-8859-1"
Content-Transfer-Encoding: 7bit
Content-Location:
file:///C:/WINDOWS/Desktop/Pages/Page_files/filelist.xml (content for the "filelist.xml" inside of "Page_files")

------=_NextPart_000_0000_01BF4561.A9B32F20--
```

FIG. 7

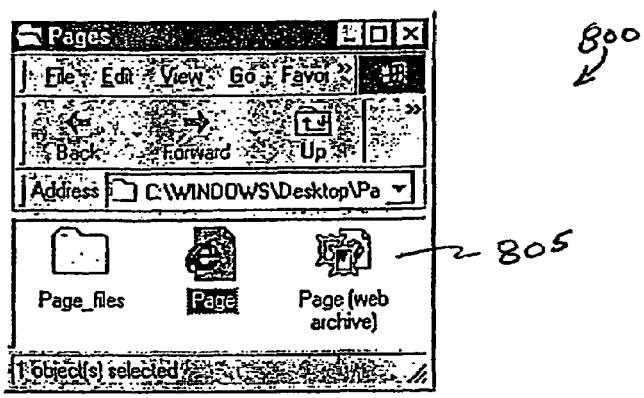

FIG. 8

METHOD AND SYSTEM FOR PACKING AND UNPACKING WEB PAGES

CROSS REFERENCE TO RELATED APPLICATION

This application is a continuation of application Ser. No. 09/587,756 filed Jun. 6, 2000.

TECHNICAL FIELD

This invention relates to storing a Web page as a single file. More particularly, this invention relates to a method and system for packing a Web page in HTML format as a MHTML file and unpacking a Web page in MHMTL format to HTML format.

BACKGROUND OF THE INVENTION

With the advent of the World Wide Web (hereinafter Web) and graphics-based Web browsers, the Web has grown exponentially to provide an information exchange of unprecedented proportion. The Web is an Internet facility that links documents both locally and remotely. A Web document, or Web page, is accessed and read via a Web browser. In the last half of the 1990s, the Web became the focus of Internet activity because Web pages containing both text and graphics were easily accessible via a Web browser. Today, those Web pages can also utilize new browser features and plug-in extensions that allow for audio, video, telephony, 3-D animations, and videoconferencing.

Hypertext Markup Language, or "HTML," is the coding behind standard Web pages. Referring now to FIG. 2A, one of the key features of HTML is the ability to render a Web page 200 composed of separate resources such as images 205, sound files, cascading style sheets, and ActiveX objects, in-lined with the marked up text 210. Referring now to FIG. 2B, the separate resources that make up the Web page 200 are typically stored in a multiple related-file storage format 215. In other words, a single Web page 200 containing text 210, sound files, and images 205 is stored as multiple related-files comprising separate files for each sound file, image, and text. For example, the main document, or Web page HTML source 220, may be stored as "Front_Page.htm" file 225. The Web page HTML source 220 may contain "links" or "pointers" to each individual sound file, image, text, etc. For example, link 230 may point to the star.gif file 235 stored in folder 240 and link 245 may point to text_box.txt file 250 stored in folder 240.

Storing a Web page in HTML format is unwieldy because it requires the storage of separate files for each resource. These separate files can be hard to manage and maintain. For example, Web site administrators or individuals may want to delete, copy, or move files around but may not know the name, location, or number of files referenced by the main HTML file. Moreover, they may rename the main HTML file but be unaware of the necessity for renaming the other supporting files or vice versa. Users have grown accustomed to having a single file per document and therefore generally have trouble managing all these files.

As may be understood from the description above, a typical Web page consists of a main HTML source file and a host of resource files, such as graphics files, sound files, etc. Often, resource files are maintained within a folder structure and the main HTML document includes links to the locations of the resource files within that folder structure. Because any given resource file may be in a folder that is different than the folder containing the main HTML document, the links in the HTML document will not be accurate unless the resource files are maintained in the folder structure.

Modern Internet users desire to integrate the components of a Web page into a single file. Such a file is easier to manage because it can be saved in a single location, can be viewed offline, and can be sent as a single attachment via e-mail. Unfortunately, the structure of an HTML Web page and its components is not conducive to such integration.

Various approaches exist for putting Web pages into a single file. One of these approaches involves storing all the different parts of a Web page inside a self-extracting executable (".exe") file. Initiating this executable file causes the different files of the Web page to be written to a temporary location and opened into a main page. Documents in executable file format, however, suffer from several drawbacks. First, they tend to be fairly large because they require additional code within the executable file. Second, users are often wary of opening executable files because there is a risk that the executable files may contain a hidden computer virus. In fact, some companies automatically remove any attached executable files from e-mail received over the Internet for fear of viruses. Additionally, not only are executable files incapable of being natively displayed in a Web browser, they are also not directly editable by any Web page authoring application.

Another approach is Hewlett-Packard's "PRINTSMART" application which allows a user to define a list of Web pages and "bundle" them together into a single reference file for printing. However, the single reference file does not actually include the resource files of the Web pages. In other words, if this single reference file is mailed to another user, they would not be able to view the resources of the Web page unless they could link to the locations of the resource files.

Previous versions of Microsoft's "INTERNET EXPLORER" Web browser included a "Save as Web Archive" feature. A user may navigate to a Web page, choose the "Save as" command and choose "Web archive" as a file format. However, this feature had several drawbacks. First, the Web page needed to be loaded into the "INTERNET EXPLORER" Web browser before it could be saved. Second, this feature did not save all of the resource files associated with the Web page such that the files could be returned to their original locations with respect to the main HTML document upon opening. For example, this feature did not capture all the slides in a slideshow presentation saved as HTML, just the first slide.

Microsoft's "INTERNET EXPLORER" Web browser also includes a "Send Page" feature. A user may load a Web page and choose "File", "Send", and "Page as E-mail." This feature creates a new mail message with the contents of the Web browser as the contents of the message. This suffers from the limitations described for the "Save as Web Archive" feature as well as additional limitations. Framesets and script aren't supported in the body of an e-mail message. Moreover, a MAPI compliant mail client that understands HTML mail is required to view the e-mail message.

Therefore, there is a need for a process for packing a Web page into a single file, so that the Web page's resource file structure is maintained and the Web page can be displayed in its original form. There is also a need for a process that packs all of the Web page content so that the unpacked Web page may be immediately viewable without an expensive extraction process.

SUMMARY OF THE INVENTION

The present invention satisfies the above described needs by allowing a user to click a right mouse button and save all of the separate HTML files that make up a Web page as a single MHTML file. A user may then manage the Web page as a single file, attach the Web page to e-mail messages, store it in a document management system, etc. When a user needs to return the Web page to HTML format, the user can click a right mouse button and unpack the Web page to its original HTML format.

Generally described, the present invention provides a computer-implemented method for packing a Web page as a MHTML file. In another embodiment, the invention is directed to a method and system for unpacking a Web page saved in MHTML format to HTML format.

In one aspect, the packing process begins by determining whether the user has write privileges to the current location. If not, the user is prompted to save the Web page in an alternate location (e.g., the desktop). If the user has write privileges to the current location, the process opens the main HTML document, or HTML source file, and searches for supporting resource files. In short, the supporting resource files are identified by searching for known, common resource file references in the main HTML document. When the resource file references have been identified, the process packages the main HTML document and all of the supporting resource files into a single file in MHTML format.

In another aspect, the unpacking process begins by opening the MHTML file and identifying the main HTML document portion, as well as the portions of the MHTML file containing the supporting resource files. Once all of the components of the Web page have been identified, the Web page's folder structure is determined by referring to the content location field contained in each separate portion of the MHTML file. The individual MHTML components are converted into files and the main HTML file is stored in the current location. The resource files are stored in locations relative to the main HTML file, as identified by the unpacked folder structure. If a resource file does not have a content location field, then it is stored in a default folder.

Combining the HTML Web page files, including the resource files, into a single MHTML file is advantageous for several reasons. First, e-mail programs do not allow folders to be sent via e-mail. An entire Web page may be sent via e-mail after using the present invention to combine multiple folders in HTML format into a single MHTML file. The present invention uses parsing techniques to ensure that all the necessary HTML resource files are included in the single MHTML file. Second, document management systems either do not allow users to create folders or their storage system is not accessible to Web browsers so that Web browsers can not display the supporting files of a Web page. Because the present invention combines an HTML Web page into a single file, an entire Web page (including supporting files) may be posted to a document management system.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIG. 7 is an illustration of a MHTML file created in accordance with an embodiment of the present invention.

FIG. 8 is an illustration of a Web page archive file created in accordance with an embodiment of the present invention.

DETAILED DESCRIPTION

Figure 1:
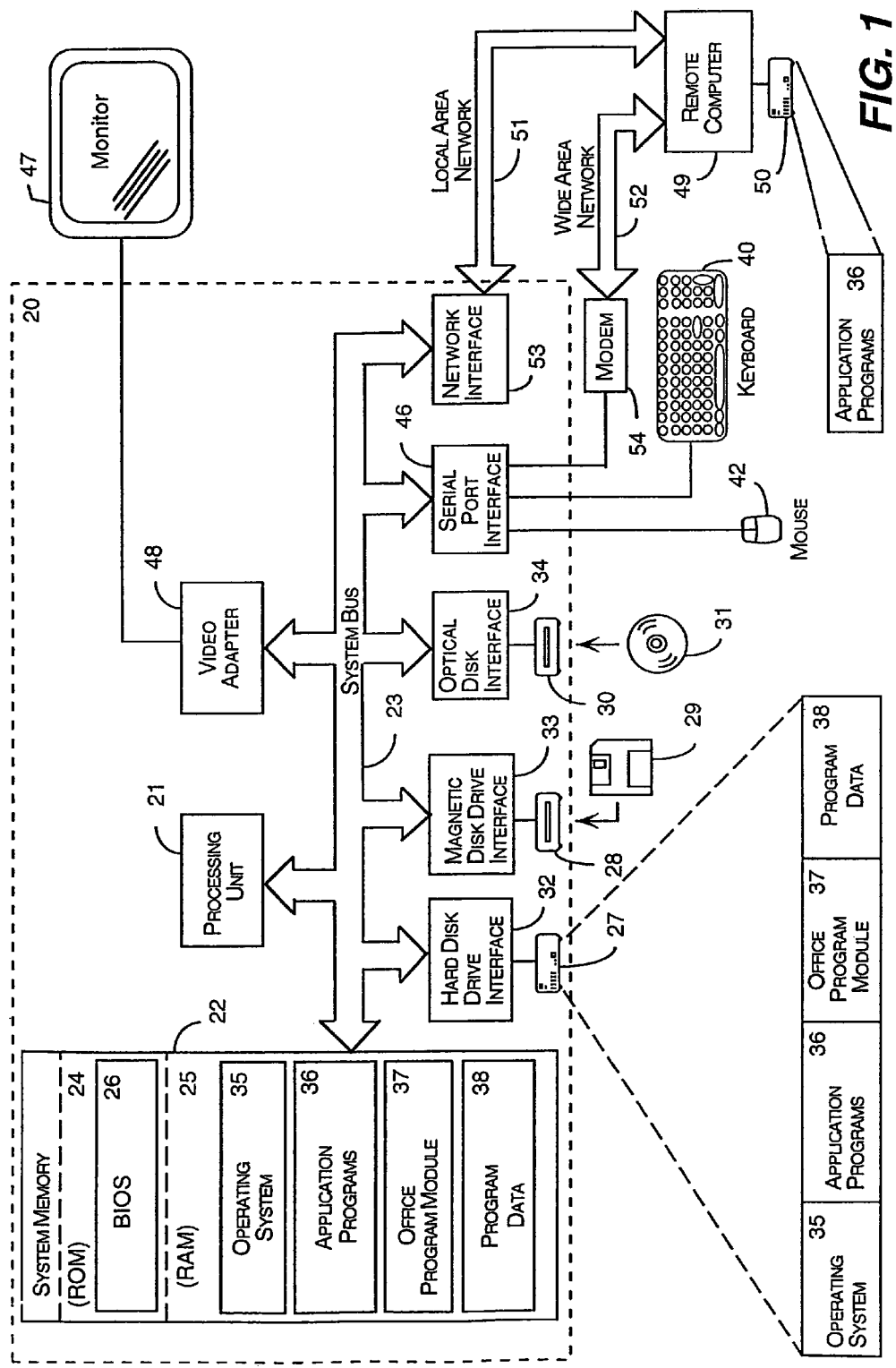
FIG. 1 is a block diagram of a computer that provides the exemplary operating environment for the present invention.
Figure 2A:
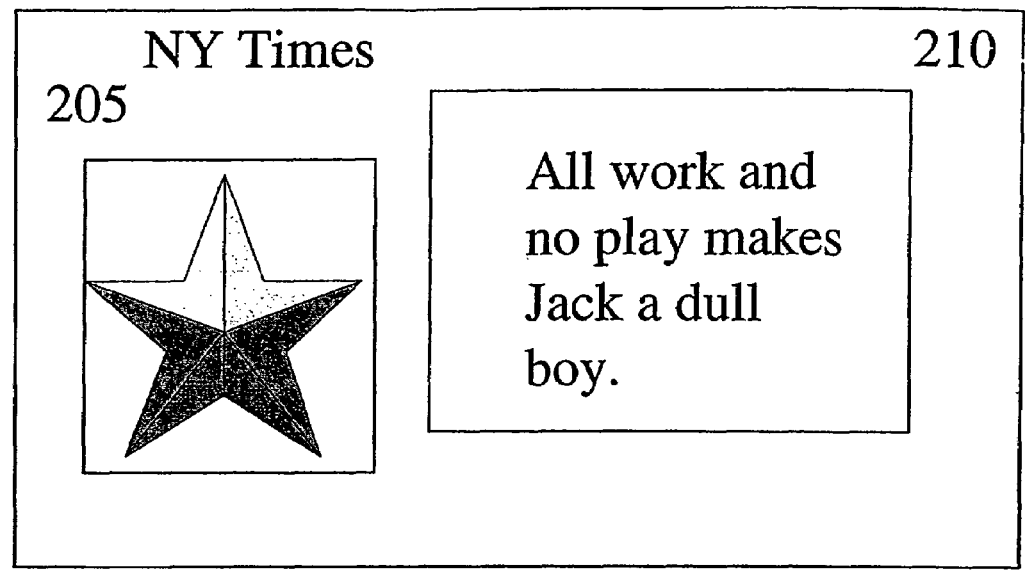
FIG. 2A is an illustration of a Web page including text and an image.
Figure 2B:
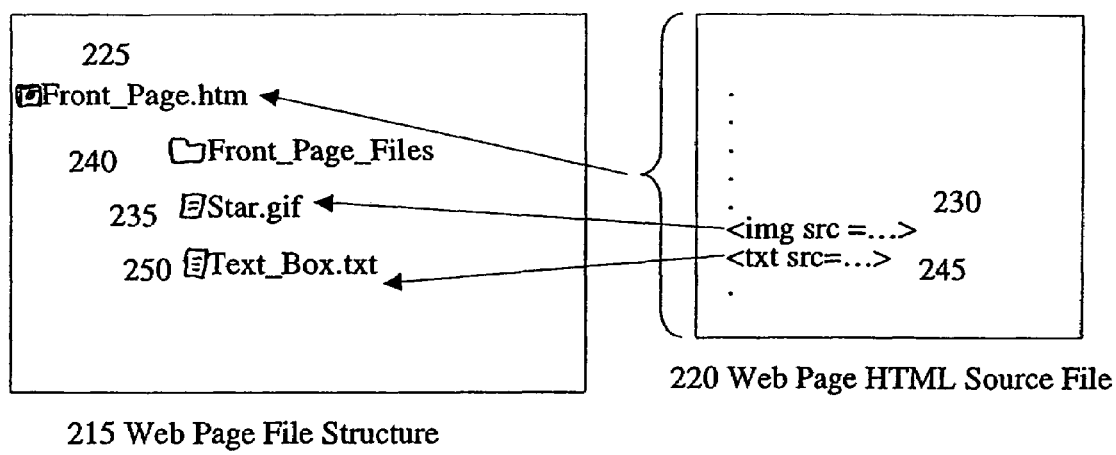
FIG. 2B is an illustration of a Web page source file and Web page file structure.

The present invention is directed to a method and system for packing a Web page as a MHTML file. In another embodiment, the invention is directed to a method and system for unpacking a Web page saved in MHTML format to HTML format.

In one embodiment, the invention is incorporated into the "OFFICE" program module, marketed by Microsoft Corporation of Redmond, Wash. Briefly described, the "OFFICE" program module is a suite of word processing, spreadsheet, presentation, database, and time management application programs along with program modules that integrate and enhance these application programs. While the invention will be described in the general context of the "OFFICE" program module running in conjunction with a personal computer, those skilled in the art will recognize that the invention also may be implemented in combination with other program modules.

An embodiment of the present invention allows a user to click a right mouse button and save all of the separate HTML files that make up a Web page as a single MHTML file. A user may then manage the Web page as a single file, attach the Web page to e-mail messages, store it in a document management system, etc. When a user needs to return the Web page to HTML format, the user can click a right mouse button and unpack the Web page to its original HTML format.

Combining the HTML Web page files, including the resource files, into a single MHTML file is advantageous for several reasons. First, e-mail programs do not allow folders to be sent via e-mail. An entire Web page may be sent via e-mail after using the present invention to combine multiple folders in HTML format into a single MHTML file. The present invention uses parsing techniques to ensure that all the necessary HTML resource files are included in the single MHTML file. Second, document management systems either do not allow users to create folders or their storage system is not accessible to Web browsers so that Web browsers can not display the supporting files of a Web page. Because the present invention combines an HTML Web page into a single file, an entire Web page (including supporting files) may be posted to a document management system.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, an "OFFICE" program module 37, program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

MIME Encapsulation of Aggregate HTML Documents ("MHTML")

MHTML is a known Internet standard that defines the MIME structure used to send HTML content in electronic mail message bodies. The following example illustrates an MHTML message with a relative reference to an embedded GIF:

```
Mime-Version: 1.0
Content-Type: multipart/related; boundary = "boundary"
--boundary
Content-Location: c:\page1.htm
Content-Type: text/html
Content-Encoding: quoted-printable
[ text of an HTML document, which might contain a
hyperlink to the other body part, for example through a
statement such as:]
<IMG SRC = 3D "page1_file\images001.gif">
--boundary
Content-Location: c:\page1_file\images001.gif
Content-Type: image/gif
Content-Transfer-Encoding: base64
AAAFFDDlhGAGgAPEAAP/////ZRaCgoAAAACH+PUNv
cHlyaWdodCAoQykgMT
NSBJRVRGLiBVbmF1dGhvcml6ZWQgZHVwbGljYXRpb
24gcHJvaGliaXR1ZC4A
etc...
--boundary--
```

Packing a Web Page

Generally described, the present invention uses MHTML as a document storage format for Web pages by providing the architecture to encapsulate referenced resources within the MHTML document. This allows the rendering of a Web page without the necessity of retrieving these resources directly over a network. Thus, the resources of the Web page, such as pictures and sound, are stored directly in the MIME hierarchy of the MHTML file. These resources can be referenced through "local" links within the MHTML file and used to complete the rendering of the Web page.

Figure 3:
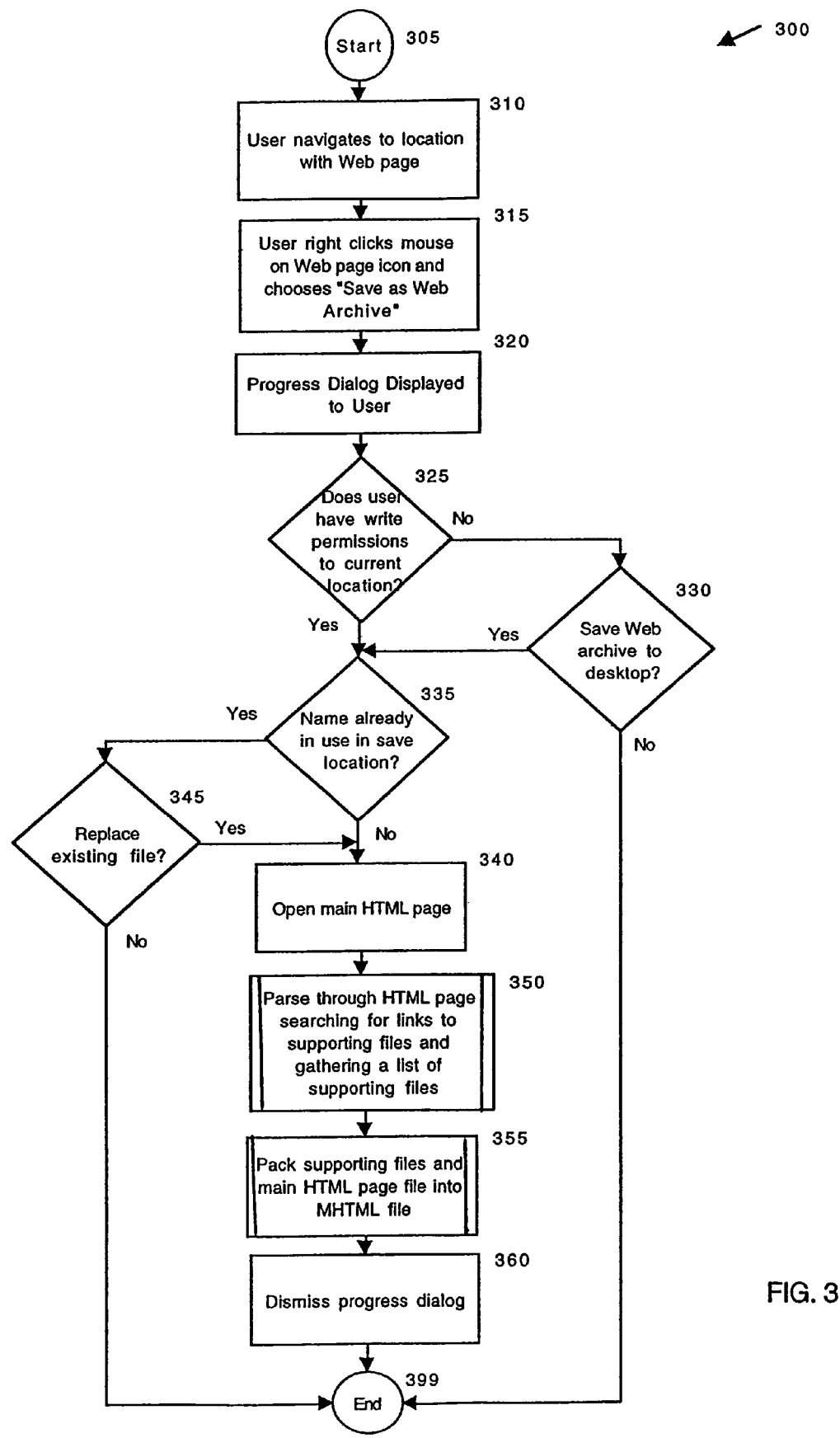
FIG. 3 is a flowchart describing a method for packing an HTML Web page as a single MHTML file in accordance with an embodiment of the invention.

Referring now to FIG. 3, a method 300 for packing a Web page as an MHTML file will be described. It should be understood that the method 300 packs an entire Web page, including supporting files, into a single MHTML file.

Figure 6A:
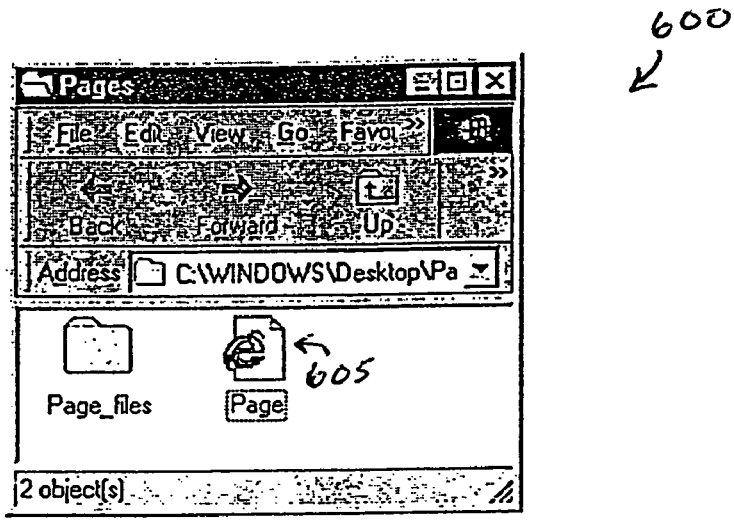
FIG. 6A is an illustration of a shell including a Web page and supporting files for the Web page.

The method 300 begins at step 305 and proceeds to step 310 when the user navigates to the location of a Web page, such as Web page 605 (FIG. 6A). It should be understood that the location of the Web page may be a traditional hard drive location such as "c:\My Documents\", a server location such as "\\fileshare\documents\", a server location such as "m:\documents", or a folder on a Web server such as "http://Webserver/". The user may navigate to this location either through a shell, such as shell 600 shown in FIG. 6A, or through a file dialog. The method then proceeds to step 315.

Figure 6B:
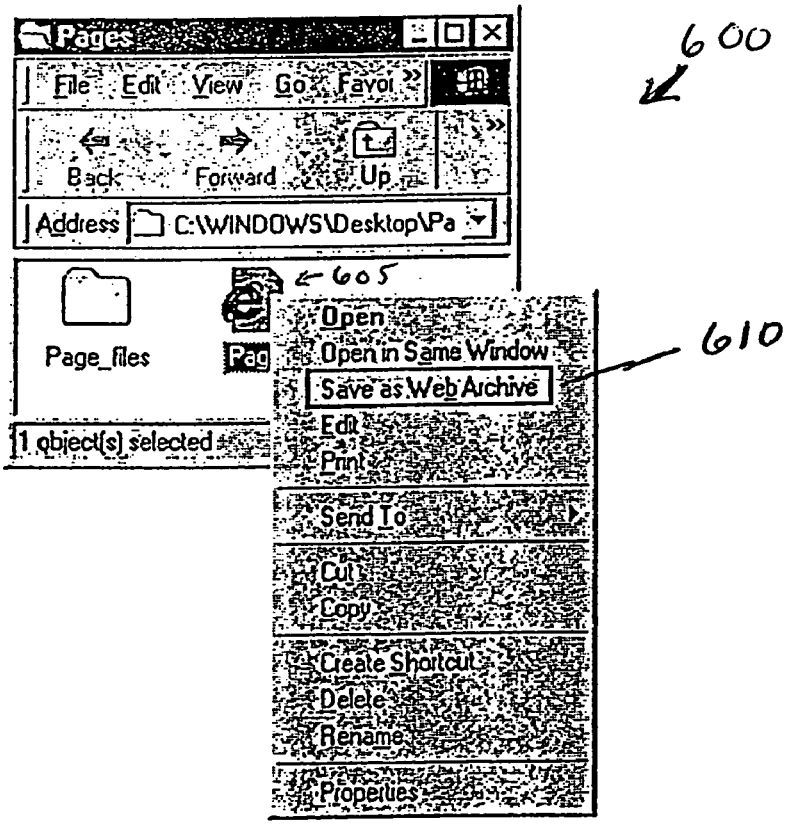
FIG. 6B is an illustration of a dropdown menu displayed to the user in accordance with an embodiment of the present invention.

At step 315, an indication is received that the user has clicked the right mouse button on a Web page, such as Web page 605 (FIG. 6A), and has chosen the action "Save as Web Archive" 610 (FIG. 6B). The method then proceeds to step 320.

At step 320, an executable file known as webarch.exe is invoked and a progress dialog is displayed to the user to inform the user of the progress being made toward packing the Web page as a MHTML file and creating a Web archive file. The method then proceeds to decision step 325.

At decision step 325, it is determined whether the user has write permissions to the current location that has been selected as the save location. If, at decision step 325, it is determined that the user does not have write permissions to the current location, then the method proceeds to decision step 330. However, if, at decision step 325, it is determined that the user does have write permissions to the current location, then the method proceeds to decision step 335.

At decision step 330, it is determined whether the user wants to save the Web archive file to the desktop. If not, then the method ends at step 399. However, if the user does want to save the Web archive file to the desktop, then the method proceeds to decision step 335.

At decision step 335, it is determined whether the name selected for the Web archive file is already in use in the save location. If not, then the method proceeds to step 340. If the name is already in use in the save location, then the method proceeds to decision step 345.

At decision step 345, it is determined whether the user wants to replace the existing file with the new Web archive file. If not, then the method ends at step 399. If so, then the method proceeds to step 340.

At step 340, the main HTML Web page, or HTML source file, is opened. In a preferred embodiment, the main HTML page is opened using a dynamic-link library (DLL) referred to as "MSHTML.dll". This DLL is disclosed in U.S. Pat. No. 6,585,777. The method then proceeds to step 350.

At step 350, the main HTML Web page is searched for links to supporting files and a list of supporting files is gathered. The method then proceeds to step 355.

At step 355, the supporting files are placed into an MHTML file. The method then proceeds to step 360.

At step 360, the progress dialog that is displayed to the user is removed. The method then ends at step 399.

Having described an exemplary embodiment of the present invention, a preferred method for performing step 350 (FIG. 3) will be described below in reference to FIG. 4.

The method begins at step 405 when the main HTML Web page is searched for "src", "lowsrc" and "dynsrc" files referenced in <img> tags. It should be understood that these files are images. These files are marked to be included in a list of supporting files. The method then proceeds to step 410.

At step 410, the main HTML Web page is searched for "background" files referenced in <body> tags. It should be understood that these files are images. These files are marked to be included in the list of supporting files. The method then proceeds to step 415.

At step 415, the main HTML Web page is searched for "src" files referenced in <script> tags. It should be understood that these files are script files. These files are marked to be included in the list of supporting files. The method then proceeds to step 420.

At step 420, the main HTML Web page is searched for "src" files referenced in <bgsound> tags. It should be understood that these files are audio files. These files are marked to be included in the list of supporting files. The method then proceeds to step 425.

At step 425, the main HTML Web page is searched for "src" files referenced in <embed> tags. It should be understood that these files are any arbitrary piece of content, including, but not limited to, a picture, a sound file, an executable file or a text file. These files are marked to be included in the list of supporting files. The method then proceeds to step 430.

At step 430, the main HTML Web page is searched for "href" files referenced in <link rel="Stylesheet"> tags. It should be understood that these files are stylesheets. These files are marked to be included in the list of supporting files. The method then proceeds to decision step 435.

At decision step 435, it is determined whether any files were found at step 430. If not, then the method proceeds to step 455. However, if some files were found at step 430, then the method proceeds to step 440.

At step 440, the stylesheets found at step 430 are loaded and searched for "@import url ( . . . )" references. This search continues three levels of stylesheets deep (searching for "href" files referenced in <link rel="Stylesheet"> tags and then searching for "@import url ( . . . )" references in the stylesheets found). These files are marked to be included in the list of supporting files. The method then proceeds to step 455.

At step 455, the main HTML Web page is searched for "src" files referenced in <frame> tags. It should be understood that these files are HTML files. These files are marked to be included in the list of supporting files. The method then proceeds to decision step 460.

At decision step 460, it is determined whether any HTML files were found at step 455. If not, then the method proceeds to step 470. However, if some files were found at step 455, then the method proceeds to step 465.

Figure 4:
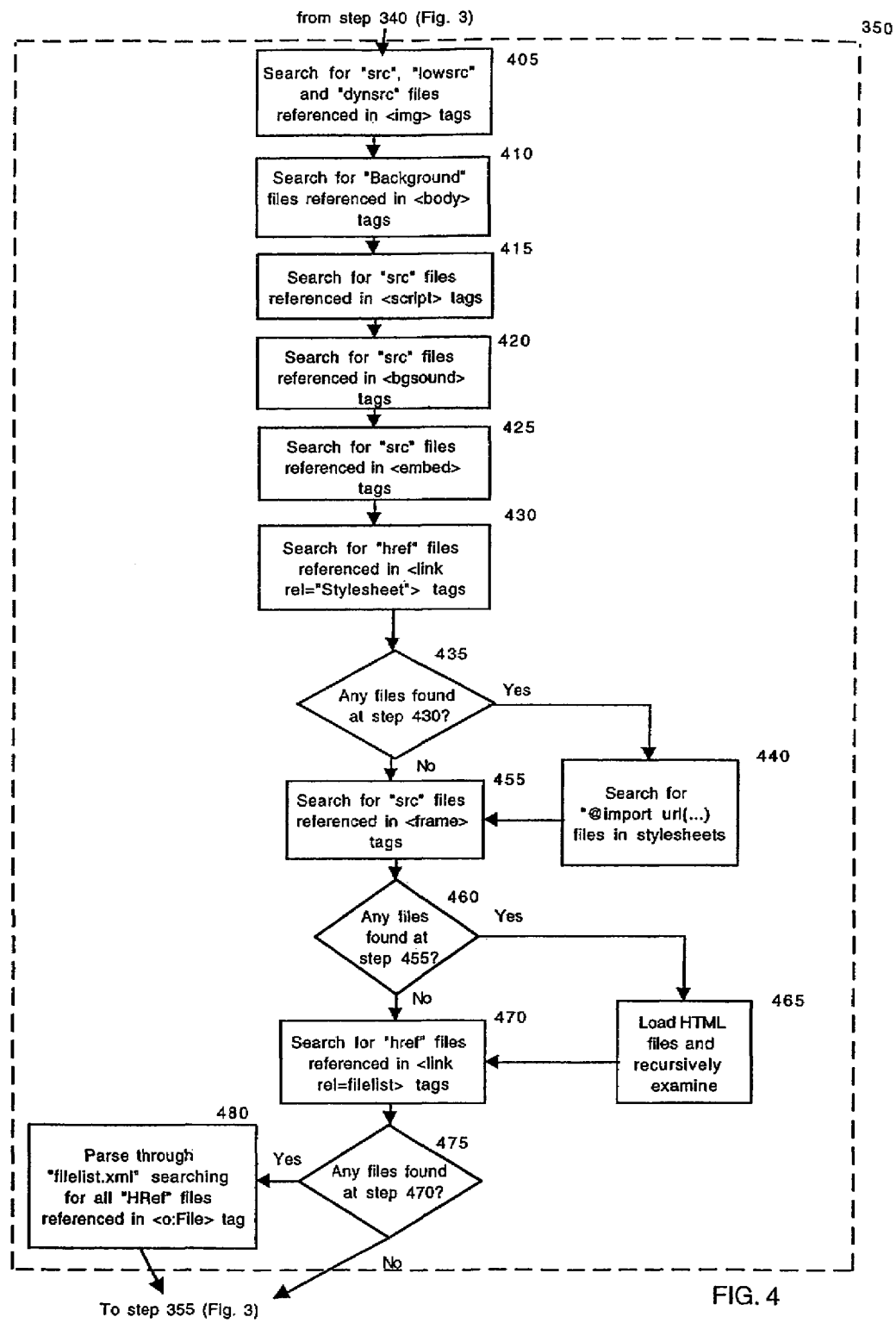
FIG. 4 is a flowchart describing a method for gathering a list of supporting files to pack into a single MHTML file in accordance with an embodiment of the present invention.

At step 465, the HTML file(s) found at step 455 is loaded and recursively examined according to the method described herein FIG. 4. It should be understood that, in a preferred embodiment, there is no bound to how many levels deep this examination is. However, any loops are avoided. After the HTML file found at step 455 is examined at step 465, the method proceeds to step 470.

At step 470, the main HTML Web page is searched for "href" files referenced in <link rel=FileList> tags. It should be understood that these files point to filelist.xml, which is a file in Microsoft's "OFFICE 2000" (and later versions). This file list keeps track of all the files that make up the Web page, not just the files referenced in the first page of the Web page. These files are marked to be included in the list of supporting files. The method then proceeds to decision step 475.

At decision step 475, it is determined whether any files were found at step 470. If not, then the method ends and the results are sent to step 355 (FIG. 3). However, if some files were found at step 470, then the method proceeds to step 480.

At step 480, the filelist.xml is parsed through and all "Href" references on an <o:File> tag are marked to be included in the list of supporting files. The method then ends and the results (the list of supporting files) are sent to step 355 (FIG. 3).

Figure 5:
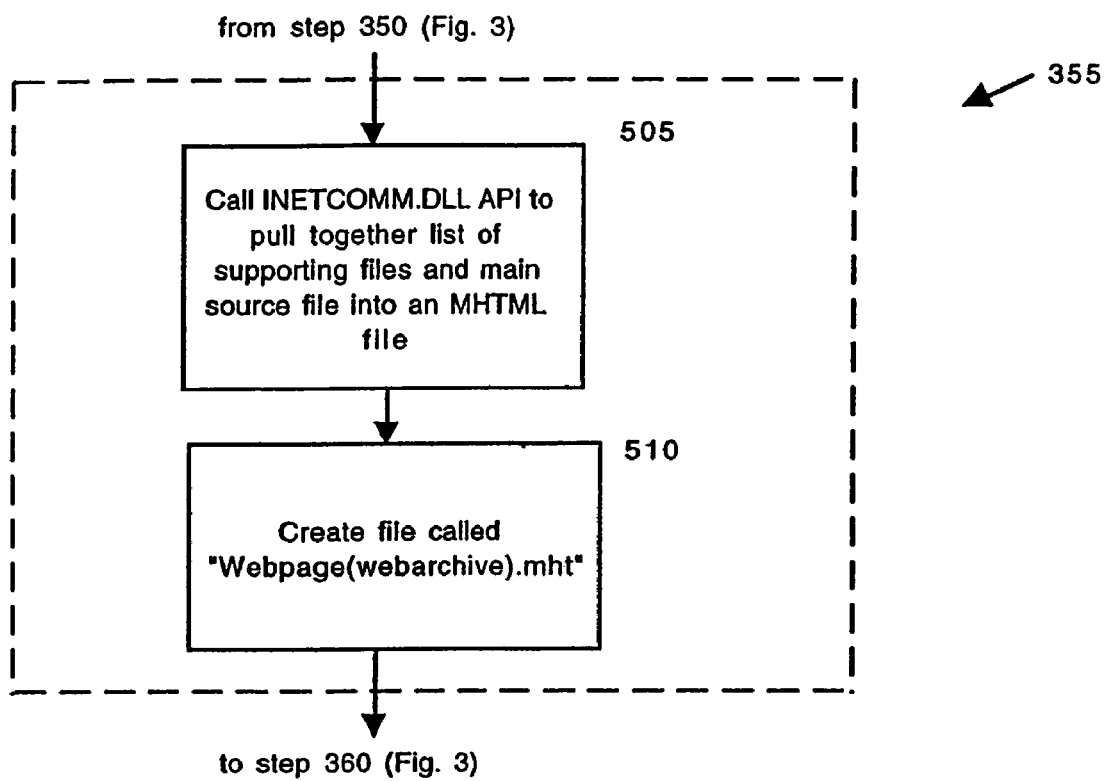
FIG. 5 is a flowchart describing a method for packing supporting files into a MHTML file in accordance with an embodiment of the present invention.

Having described a preferred method for performing step 350 (FIG. 3) above with regard to FIG. 4, a preferred method for performing step 355 (FIG. 3) will be described below in reference to FIG. 5.

The method begins at step 505 when the INETCOMM.DLL application programming interface (API) is called to put the list of supporting files gathered at step 350 and the main HTML source file into an MHTML file. The method then proceeds to step 510.

At step 510, a file is created called "Webpage(web archive).mht", where "Webpage" is the name of the Web page that was right clicked on at step 315 (FIG. 3). The new file is created next to the main Web page if the user had write permissions or on the user's desktop if the user did not have write permissions. The main HTML Web page that the user right-clicked on becomes the main MIME part of the MHTML file. All the supporting files found at step 350 are added to the MHTML file. Each supporting file is assigned the appropriate content-type and content-location, where the content-location is set to the real world location of the file. A sample MHTML file 700 created using an embodiment of the present invention is shown in FIG. 7.

The preferred method for performing step 355 then ends and step 360 (FIG. 3) is performed. The user is then presented with the shell 800 shown in FIG. 8, including the newly created Web archive file 805. The user now has a single file containing all the content in the Web page. The file 805 may be attached to an e-mail message, saved in a document management system, etc.

Unpacking the Web Page

Figure 9:
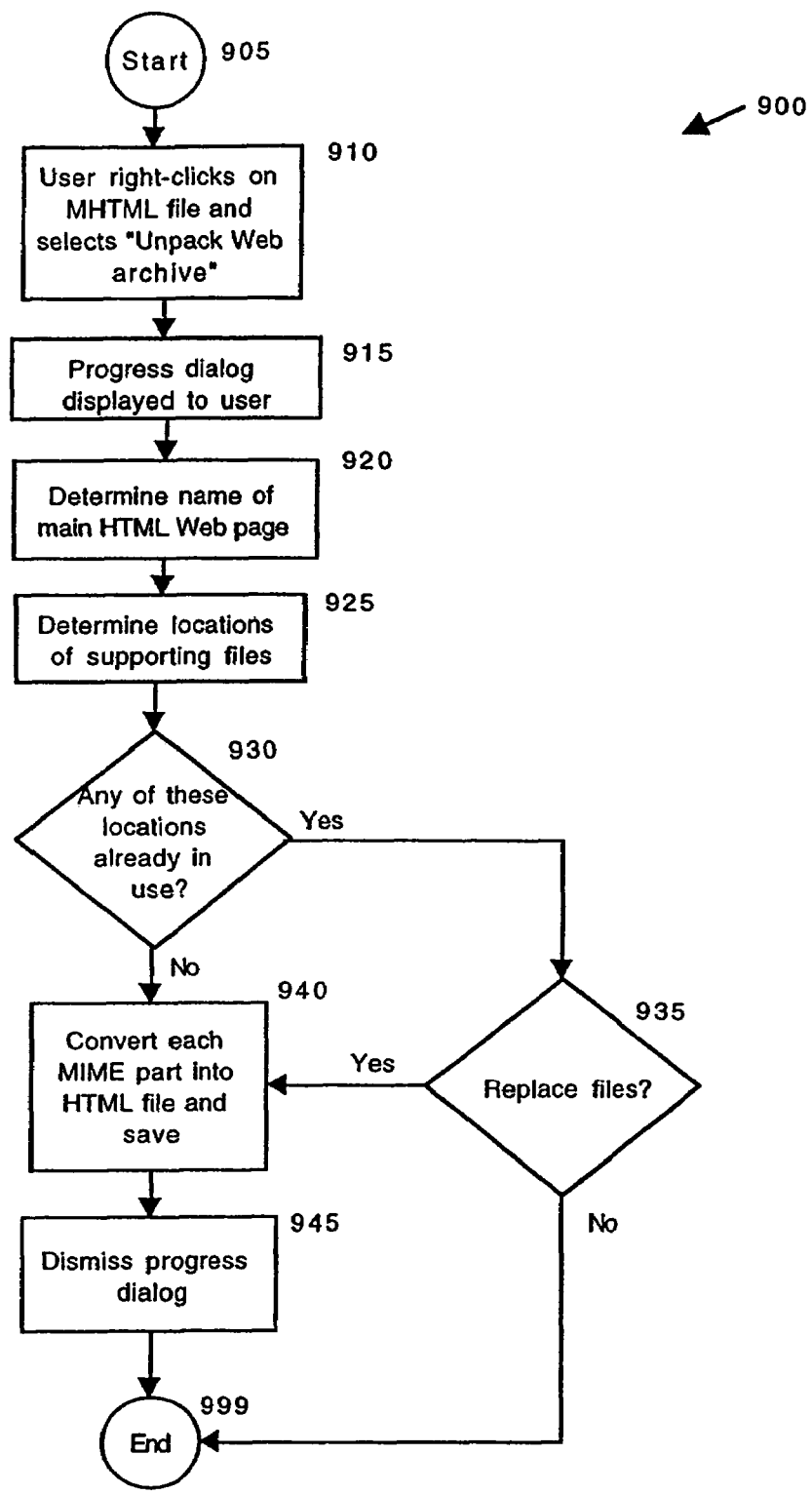
FIG. 9 is a flowchart describing a method for unpacking a MHTML file into HTML format in accordance with an embodiment of the present invention.

Referring now to FIG. 9, a method 900 for unpacking an MHTML file to return the original Web page will be described. The method 900 begins at start step 905 and proceeds to step 910 as the user right-clicks on an MHTML file, such as file 805 (FIG. 8), and selects an "Unpack Web archive" command from the drop-down menu. The method then proceeds to step 915.

At step 915, a progress dialog is displayed to indicate the progress made in unpacking the MHTML file. The method then proceeds to step 920.

At step 920, the name of the main HTML Web page is determined. If the main HTML part of the MHTML file has a content-location, then a leaf name is extracted from the content-location and that leaf name is used as the name of the Web page. If a leaf name can not be found, the name of the MHTML file the user right-clicked on is used as the name (with an .htm extension). The method then proceeds to step 925.

At step 925, the locations of supporting files are determined. If a valid file name for the main HTML page could not be determined, then each supporting file is located inside a folder called "Webpage_files", where "Webpage" is the name of the Web archive file. If a supporting file does not have a content-location (e.g. it is referenced using a content-id) or if the content-location does not have a file name, the supporting file is located inside the "Webpage_files" folder.

The content-location of the supporting file is compared with the content-location of the main file. If the supporting file is in the same folder as the main file, or in a folder below the main file, then the folder structure is recreated and the supporting file is placed there. Otherwise, the supporting file is placed inside the "Webpage_files" folder.

Figure 10A:
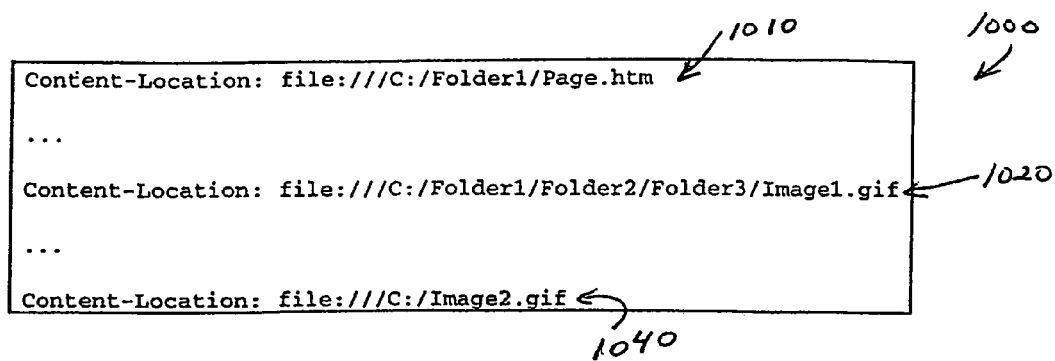
FIG. 10A is an illustration of the content location configuration of an MHTML file created in accordance with an embodiment of the present invention.
Figure 10B:
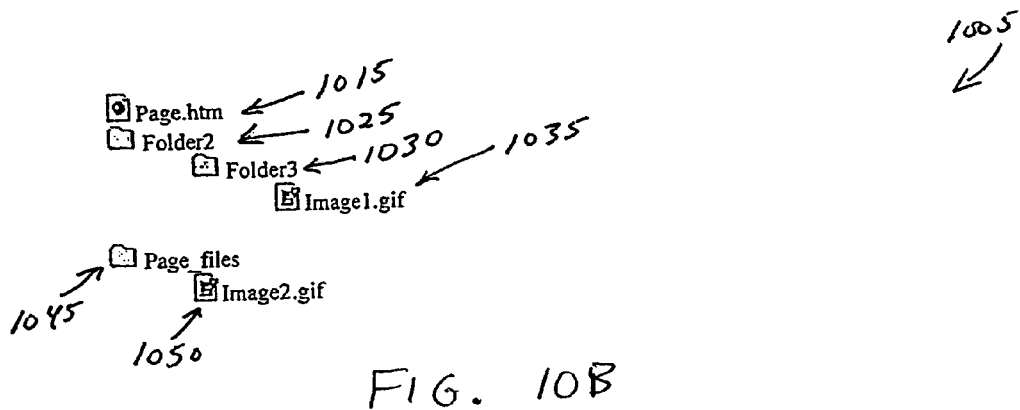
FIG. 10B is an illustration of the HTML file structure of an unpacked MHTML Web page.

For example, suppose the content location configuration of MHTML file 1000 in FIG. 10A is used to unpack MHTML file 1000. If the file 1000 was unpacked to the desktop, the file structure 1005 shown in FIG. 10B would be created. As illustrated in FIGS. 10A-10B, content-location 1010 is unpacked to create the main HTML Web page file 1015 under Folder1 (not shown). Content location 1020, which is in the folder containing the main HTML Web page file 1015, is then unpacked and Folder2 1025 and Folder3 1030 are then created under Folder1. The Image1.gif 1035 is then placed inside Folder3 1030. However, content location 1040 is not in the folder containing the main HTML Web page file 1015 or in a folder below the main file. Therefore, the Image2.gif 1050 is placed inside the "Webpage_files" folder (Page_files folder 1045 in FIG. 10B).

Returning now to FIG. 9, the method 900 then proceeds to decision step 930 where it is determined whether any of the file locations found at step 925 are already in use. If so, then the method proceeds to decision step 935. If not, then the method 900 proceeds to step 940.

At decision step 935, it is determined whether the user wants to replace the files that are already in use. If not, then the method 900 ends at step 999. If so, then the method proceeds to step 940.

At step 940, each MIME part of the MHTML file is converted into HTML and saved. In a preferred embodiment, the INETCOMM DLL is used for the conversion. The method 900 then proceeds to step 945.

At step 945, the progress dialog is dismissed and the user will see the unpacked Web page and all its files. The method then ends at step 999.

It should be understood that in unpacking the MHTML file there may be instances where the leaf name for a supporting file cannot be determined. In these instances, a preferred embodiment of the present invention assigns the name "fileNNNN", where "NNNN" starts at "0001" and increases upward for each supporting file. If the appropriate content-type for the supporting file can be determined, then the appropriate extension is attached to the file. If the appropriate content-type for the supporting file can not be determined, then the extension ".tmp" is attached to the file.

It should be understood that in unpacking the MHTML file there may be instances where the two supporting files with the same name are saved to the "_files" directory. In these instances, a preferred embodiment of the present invention renames one of the files using the "fileNNNN" scheme described above to avoid any confusion with regard to the same-named files.

It should be understood that, in a preferred embodiment, the unpacking would fix references to files that were renamed or moved in the unpacking process so that the resulting Web page does not lose any content.

It should be understood that the present invention utilizes an existing open standard, MIME Encapsulation of Aggregate HTML Documents ("MHTML") as a Web page storage format. The MHTML document format provides single-file simplicity as well as the functionality of being natively rendered in Web browsers such as Microsoft's "INTERNET EXPLORER" Web browser. In addition, MHTML documents can be edited using document authoring tools such as Microsoft's "WORD" word processor application program.

It should be understood that the present invention avoids the limitations of the prior art. The present invention is a method for using an existing open standard, MIME Encapsulation of Aggregate HTML Documents ("MHTML") as a storage format for a Web page. A single file contains all of the Web page content. The file is not an executable file and so it avoids security risks. If a user has Microsoft's "INTERNET EXPLORER" Web browser (version 4.0 or later), the file is immediately viewable without an expensive extraction process. Packing and unpacking a Web page are symmetric. Both are right-click menus and user gets the result in their current window. A user does not need to first load the Web page in a different application before packing or unpacking. A user can even package a Web page in the "Insert File" dialog. The content of any Web page may be packaged, including a Web page created with document creation tools such as Microsoft's "OFFICE" suite of applications.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A method for packing a page as a single file, the method comprising:
receiving an indication that a user has selected through a shell or file dialog a page representation corresponding to a main markup language document of the page, and in response to receiving the indication, displaying a selectable representation associated with packaging the page into a single file;
receiving an indication that the user has selected the representation associated with packaging the page into a single file;
in response to receiving the selection associated with packaging the page, making a determination as to whether the file includes at least one link to at least one resource file;
in response to a determination that the file includes at least one link to at least one resource file, packing the file and the at least one resource file into a single file;
wherein packing the file and the at least one resource file into a single file comprises:
storing a main markup language document of the page as a first component of the packaged file, the first component having a first content-location description corresponding to the location of the main markup language document,
storing the at least one resource file as a second component of the packaged file, the second component having a second content-location description corresponding to the location of the at least one resource file, and
wherein the first content-location description and the second content-location description define a folder structure corresponding to locations of the file and the resource file in relation to each other; and
displaying a representation of the packaged page file in the shell or file dialog containing the page representation corresponding to the main markup language document of the page;
determining whether the user desires to unpack the main markup language document; and
in response to determining that the user desires to unpack the main markup language document:
extracting a leaf name from the content-location description to be used as the name of the main markup language document,
comparing the content-location description of each MIME part of the single file with the content-location description of the main markup language part of the single file,
creating a folder structure corresponding to the content-location descriptions of the main markup language document and the MIME parts, wherein the folder structure includes a generic folder for storage of supporting files that do not have a content-location description,
for each MIME part, determining if the supporting file is in the same folder as the main markup language document or in a subfolder below the main file,
if the supporting file is in the same folder as the main markup language document or in a subfolder below the main file, converting the MIME part into HTML and saving the supporting file in the folder designated by the content-location description, and
if the supporting file is not in the same folder as the main markup language document and is not in a subfolder below the main file, converting the MIME part into HTML and saving the supporting file in the generic folder.

2. The method recited in claim 1 wherein the main markup language document of the page comprises a main HTML document of a Web page.

3. The method recited in claim 2 wherein the single file is an MHTML file.

4. The method recited in claim 1, further comprising:
for each MIME part, determining if a leaf name can be extracted from the content-location description;
if a leaf name for the supporting file can be extracted, saving the supporting file with the leaf name in the folder designated by the content-location description; and
if a leaf name for the supporting file cannot be extracted, assigning the supporting file a name corresponding to the number of supporting files previously saved without an extracted leaf name, and attaching a file extension corresponding to a content-type description stored with the supporting file as a component of the MHTML file.

5. The method recited in claim 4, wherein making the determination as to whether the main HTML file includes the at least one link to the at least one resource file comprises:
searching for links to resource files in the main HTML document, and
gathering a list of the resource files.

6. The method recited in claim 4, wherein assigning the supporting file the name if the leaf name for the supporting file cannot be extracted further comprises fixing references to the supporting file in the main HTML document.

7. A computer-readable storage medium which stores a set of instructions which, when executed, performs a method for packing a page as a single file, the method executed by the set of instructions comprising:
receiving an indication that a user has selected through a shell or file dialog a page representation corresponding to a main markup language document of the page, and in response to receiving the indication, displaying a selectable representation associated with packaging the page into a single file;
receiving an indication that the user has selected the representation associated with packaging the page into a single file;
in response to receiving the selection associated with packaging the page, making a determination as to whether the file includes at least one link to at least one resource file;

in response to a determination that the file includes at least one link to at least one resource file, packing the file and the at least one resource file into a single file;
wherein packing the file and the at least one resource file into a single file comprises:
   storing a main markup language document of the page as a first component of the packaged file, the first component having a first content-location description corresponding to the location of the main markup language document,
   storing the at least one resource file as a second component of the packaged file, the second component having a second content-location description corresponding to the location of the at least one resource file, and
   wherein the first content-location description and the second content-location description define a folder structure corresponding to locations of the file and the resource file in relation to each other; and
displaying a representation of the packaged page file in the shell or file dialog containing the page representation corresponding to the main markup language document of the page;
in response to determining that the user desires to unpack the main markup language document,
extracting a leaf name from the content-location description to be used as the name of the main markup language document,
comparing the content-location description of each MIME part of the a single file with the content-location description of the main markup language part of the single file,
creating a folder structure corresponding to the content-location descriptions of the main markup language document and the MIME parts, wherein the folder structure includes a generic folder for storage of supporting files that do not have a content-location description,
for each MIME part, determining if the supporting file is in the same folder as the main markup language document or in a subfolder below the main file,
if the supporting file is in the same folder as the main markup language document or in a subfolder below the main file, converting the MIME part into HTML and saving the supporting file in the folder designated by the content-location description, and
if the supporting file is not in the same folder as the main markup language document and is not in a subfolder below the main file, converting the MIME part into HTML and saving the supporting file in the generic folder.

8. The computer-readable storage medium according to claim 7 wherein the main markup language document of the page comprises a main HTML document of a Web page.

9. The computer-readable storage medium according to claim 7 wherein the single file is an MHTML file.

10. The computer-readable storage medium according to claim 7, further comprising:
   for each MIME part, determining if a leaf name can be extracted from the content-location description;
   if a leaf name for the supporting file can be extracted, saving the supporting file with the leaf name in the folder designated by the content-location description; and
   if a leaf name for the supporting file cannot be extracted, assigning the supporting file a name corresponding to the number of supporting files previously saved without an extracted leaf name, and attaching a file extension corresponding to a content-type description stored with the supporting file as a component of the MHTML file.

11. A system for packing a page as a single file, the system comprising:
   a memory storage; and
   a processing unit coupled to the memory storage, wherein the processing unit is operative to:
      receive an indication that a user has selected through a shell or file dialog a page representation corresponding to a main markup language document of the page, and in response to receiving the indication, display a selectable representation associated with packaging the page into a single file;
      receive an indication that the user has selected the representation associated with packaging the page into a single file;
      in response to receiving the selection associated with packaging the page, make a determination as to whether the file includes at least one link to at least one resource file;
      in response to a determination that the file includes at least one link to at least one resource file, pack the file and the at least one resource file into a single file, the processing unit being operative to pack comprise the processing unit being operative to:
         store a main markup language document of the page as a first component of the packaged file, the first component having a first content-location description corresponding to the location of the main markup language document,
         store the at least one resource file as a second component of the packaged file, the second component having a second content-location description corresponding to the location of the at least one resource file, and
         wherein the first content-location description and the second content-location description define a folder structure corresponding to locations of the file and the resource file in relation to each other;
      display a representation of the packaged page file in the shell or file dialog containing the page representation corresponding to the main markup language document of the page;
      in response to determining that the user desires to unpack the main markup language document,
      extract a leaf name from the content-location description to be used as the name of the main markup language document,
      compare the content-location description of each MIME part of the a single file with the content-location description of the main markup language part of the single file,
      create a folder structure corresponding to the content-location descriptions of the main markup language document and the MIME parts, wherein the folder structure includes a generic folder for storage of supporting files that do not have a content-location description,
      for each MIME part, determine if the supporting file is in the same folder as the main markup language document or in a subfolder below the main file,
      if the supporting file is in the same folder as the main markup language document or in a subfolder below the main file, convert the MIME part into HTML and saving the supporting file in the folder designated by the content-location description, and if the supporting file is not in the same folder as the main markup language document and is not in a subfolder below the main file, convert the MIME part into HTML and saving the supporting file in the generic folder;

the main markup language document of the page comprises a main HTML document of a Web page;

the single file is an MHTML file;

for each MIME part, determine if a leaf name can be extracted from the content-location description;

if a leaf name for the supporting file can be extracted, save the supporting file with the leaf name in the folder designated by the content-location description; and if a leaf name for the supporting file cannot be extracted, assign the supporting file a name corresponding to the number of supporting files previously saved without an extracted leaf name, and attach a file extension corresponding to a content-type description stored with the supporting file as a component of the MHTML file.

\* \* \* \* \*